(12) United States Patent
Chang

(10) Patent No.: US 6,885,371 B2
(45) Date of Patent: Apr. 26, 2005

(54) SYSTEM AND METHOD OF IDENTIFYING A SELECTED IMAGE OBJECT IN A THREE-DIMENSIONAL GRAPHICAL ENVIRONMENT

(75) Inventor: Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 10/136,699

(22) Filed: Apr. 30, 2002

(65) Prior Publication Data

US 2003/0202695 A1 Oct. 30, 2003

(51) Int. Cl.[7] .............................................. G06T 15/20
(52) U.S. Cl. ...................... 345/427; 345/441; 345/423; 382/190; 382/199; 382/203; 382/216
(58) Field of Search ................................. 345/419, 427, 345/441, 423; 382/190, 199, 203, 216

(56) References Cited

U.S. PATENT DOCUMENTS

| 4,982,438 A | 1/1991 | Usami et al. |
| 5,710,916 A | 1/1998 | Barbaraet et al. |
| 5,974,169 A | 10/1999 | Bachelder |
| 6,175,652 B1 * | 1/2001 | Jacobson et al. ........... 382/216 |

* cited by examiner

Primary Examiner—Kimbinh T. Nguyen (57) ABSTRACT

A system and method of locating a selected point in a bounded area of a three-dimensional graphical environment is described in which boundary points are assigned to boundaries of the area wherein boundary axes are formed (20), a selected boundary is determined by determining the consecutive boundary axes that the viewing orientation vector lies between (21), and a selected point on the selected boundary is determined dependent on angles formed by the selected boundary, the first and second boundary axes, and the viewing orientation vector (22). The selected point coordinate is compared and matched to image object coordinates (23) to determine the selected image object.

16 Claims, 7 Drawing Sheets

SYSTEM AND METHOD OF IDENTIFYING A SELECTED IMAGE OBJECT IN A THREE-DIMENSIONAL GRAPHICAL ENVIRONMENT

FIELD OF THE INVENTION

The present invention relates to three-dimensional graphical environments and in particular, this disclosure provides a technique of identifying a selected image object within the three-dimensional graphical environment dependent on a current viewing perspective.

BACKGROUND OF THE INVENTION

Three-dimensional graphical interfaces display information within a three-dimensional graphical (or virtual) environment to allow viewing of and navigation through information in an intuitive and immersive manner. Since people are physically accustomed to navigating through and viewing objects in a real three-dimensional world, a three-dimensional graphical environment becomes an intuitive, immersive, and natural environment to the user. Often, the information that is represented by the three-dimensional interface is a large database of data objects. The interface displays the data objects as representative images within the three-dimensional graphical environment and then provides the user the ability to navigate within the virtual environment to view the representative images and interact with the corresponding data objects. In order to create a three-dimensional graphical environment, it is typical to divide or partition the environment into a plurality of three-dimensional areas (e.g. rooms) having a plurality of image objects distributed on the boundaries of each area that has the effect of logically dividing and displaying the objects within the environment. Essentially, partitioning the environment and distributing image objects within the partitioned environment facilitates navigation through the environment (where an "image object" can be generally defined as any visual representation of the data object displayed within the graphical environment including, but not limited to, images, video, three dimensional images, and audio clips).

In known user interfaces, representative images can be selected and interacted with within each three-dimensional partitioned area by lining up the point of sight of the user's viewing perspective with an image object of interest on a partition within the environment and then selection and/or activation can be initiated by the user with an input device such as a keyboard, mouse, or joystick.

According to one known method, in order to identify the image object that the user's line of sight is directed towards, all objects having coordinates along the line of sight in the environment coordinate system are determined and these image objects are then searched to identify the image object having coordinates that are closest to the user position coordinates. In a database having many data objects, this search technique can be very time consuming. In order for a three-dimensional graphical environment to be effective and engaging to the user, the user interface needs to be sufficiently responsive to allow real-time user interaction with the environment. Time consuming object selection operations minimize the environment's ability to provide sufficient real-time responsiveness to the user.

In an alternative known technique for identifying image objects, when the line of sight of the user lines up with a displayed image object in the graphical environment, a set of color patches is yielded. These patches are then compared with an updated list of previously rendered three-dimensional shapes, and the image object corresponding to the matching shape is selected. This type of approach requires a significant amount of memory storage area to store and maintain the shape list. In addition, the searching algorithm processing time increases with the number of objects in the scene thereby reducing the interface's real-time responsiveness.

What is needed is a simple and fast technique of identifying a selected image object in a three-dimensional graphical environment, thereby facilitating an effective and engaging real-time user interface for the three-dimensional graphical environment.

SUMMARY OF THE INVENTION

A method of identifying a selected image object displayed within a three-dimensional graphical environment is described. In one embodiment, the graphical environment includes an area bounded by boundaries. The image object is selected by an input device having an associated viewing perspective defined by a viewing position and a viewing orientation vector in a primary coordinate plane within the environment. In one embodiment, coordinate points are initially assigned to boundaries such that each boundary point forms a boundary axis with the viewing position. Angles formed between each boundary axis and the viewing orientation vector are used to determine first and second consecutive boundary axes that the viewing orientation vector lies between. Each of the first and second boundary axes have associated first and second boundary points, respectively, defining a selected boundary. The coordinate of a selected point on the selected boundary is determined dependent on angles formed by the selected boundary, the first and second boundary axes, and the viewing orientation vector. The selected point coordinate within the primary coordinate plane is matched with the coordinate of one of a plurality of image object coordinates to identify the selected image object.

In another embodiment of the method of identifying a selected image object displayed within a three-dimensional graphical environment, the selected point on the selected boundary defined within the primary coordinate plane is a first intermediate point used to both define a secondary coordinate plane and determine a second selected point within the secondary coordinate plane. The coordinate of the second selected point is then matched with the coordinate of one of a plurality of image object coordinates to identify the selected image object.

One embodiment of a system of identifying a selected image object displayed within a three-dimensional graphical area includes a means for assigning boundary points, a means for determining a selected boundary, a means for determining a selected point coordinate on the selected boundary, and a means for matching a selected point coordinate to an image object. It should be noted the elements of the system can be implemented by a computing system including a processor or processing device. Moreover, the elements of the system can be implemented by any combination of software, hardware, or firmware.

DETAILED DESCRIPTION OF THE INVENTION

In general, the present invention is a system and method of identifying an image object in a three-dimensional graphical environment selected by a user interface device. As is well known in the field of three-dimensional graphical environment design, input devices are used to navigate through and select image objects within a three-dimensional graphical environment displaying a plurality of image objects. Typically, the user controls the interface device (e.g., mouse, joystick, keyboard) to establish a given viewing perspective or line of sight towards the object he/she would like to view or select.

Figure 1:
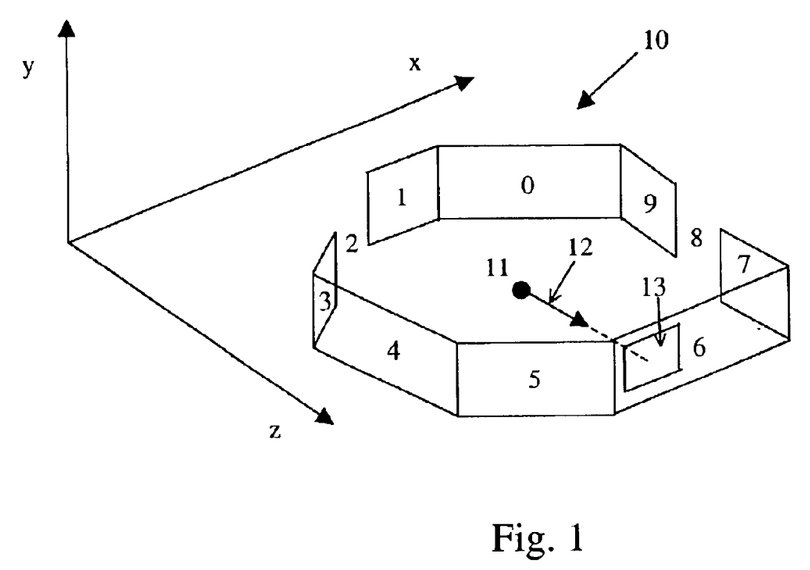
FIG. 1 illustrates a bounded three-dimensional graphical area and a viewing perspective defined by a primary coordinate plane within the area.

FIG. 1 shows a first example of an area 10 of a three-dimensional graphical environment. As is well known in the field of three-dimensional graphical environment design, environments are often partitioned into areas to facilitate user navigation and display of image objects within the environment. The partitioned area shown in FIG. 1 is bounded by a plurality of boundaries 0–9. In general, it is assumed the boundaries are perpendicular to the "floor" of the area. It should be noted that boundaries can be embodied as partitions or as openings as shown in FIG. 1. According to the present invention a plurality of image objects can be distributed and displayed on the boundaries of each area. Note that although FIG. 1 shows a single image object 13 displayed on boundary 6 of area 10, a plurality of image objects can be distributed on each of the boundaries. According to this example, it is assumed that a single row of image objects is displayed along the partitions.

Figure 2:
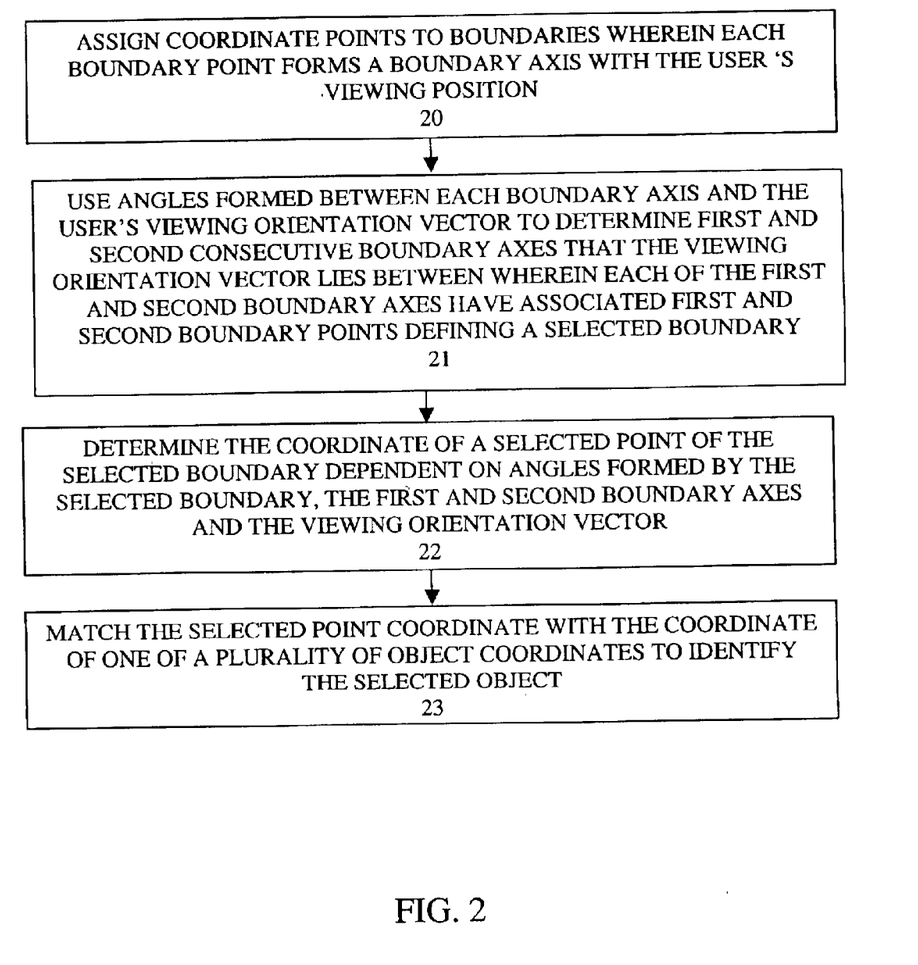
FIG. 2 illustrates a first embodiment of a method of identifying a selected image object in a three-dimensional graphical environment in accordance with the present invention.
Figure 3:
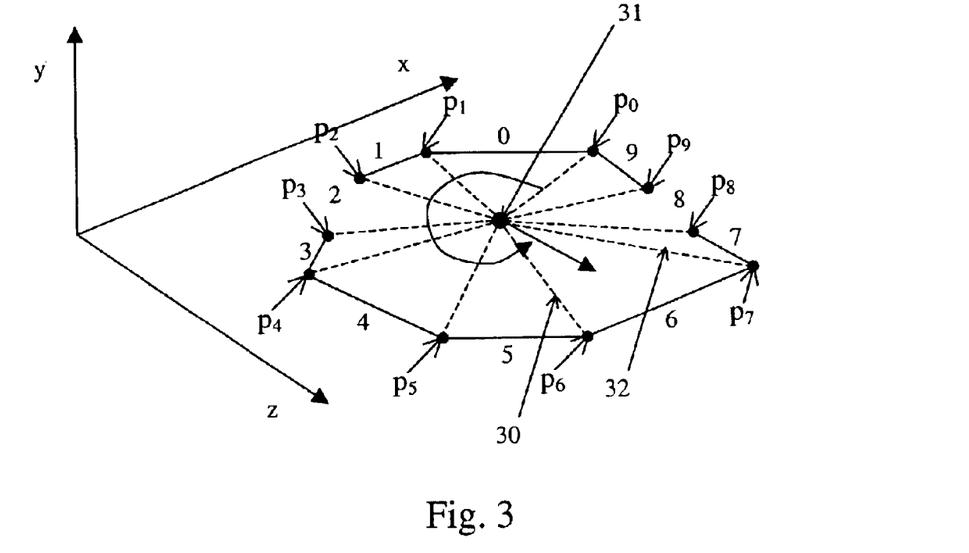
FIG. 3 illustrates a two-dimensional graphical bounded area corresponding to the three-dimensional area shown in FIG. 1, including boundary points and boundary axes used for determining a selected boundary.

FIG. 2 shows a first embodiment of the method of identifying an image object within a three-dimensional graphical environment (e.g., image object 13 in graphical environment 10, FIG. 1). According to this method, it is assumed that a single row of image objects is displayed along the partitions and the viewing perspective of a user interface device is defined by a viewing position (or coordinate) and a viewing orientation vector having an associated pan angle each defined within a primary coordinate plane within the three-dimensional graphical environment. In the example shown in FIG. 1, the primary coordinate plane is the x-z plane. According to the method, coordinate points are assigned to boundaries (20, FIG. 2). FIG. 3 shows an example of assigning each of boundaries 0–9 (FIG. 1) two consecutive coordinate points. For instance, boundary 0 is assigned boundary points $p_0$ and $p_1$, boundary 1 is assigned boundary points $p_1$ and $p_2$, boundary 2 is assigned boundary points $p_2$ and $p_3$. Boundaries corresponding to openings (e.g. boundaries 2 and 8) and partitions (e.g., boundaries 0,1,3,4,5–7, and 9) are both assigned coordinate points. In one embodiment, each coordinate point $p_1$ (i.e., $p_0$–$p_9$) has associated coordinates $(u_i, v_i)$ defined with respect to the viewing position x-z coordinate system defined within the primary coordinate plane (i.e., the x-z plane). In addition according to block 20 (FIG. 2), each boundary point forms a boundary axis with the user's viewing position. For instance, boundary axis 30 is formed by boundary point P6 and the viewing position 31.

Once coordinate points are assigned and hence boundary axes are formed, the angles formed between each boundary axis and the viewing orientation vector is used to determine first and second consecutive boundary axes that the viewing orientation vector lies between (21, FIG. 2). Each of the first boundary axis and the second boundary axis has associated first and second boundary points defining a selected boundary. For instance, referring to FIG. 3, the first boundary axis corresponds to axis 30 having an associated boundary point $p_6$, the second boundary axis corresponds to axis 32 having an associated boundary point $p_7$, and the selected boundary defined by $p_6$ and $p_7$ corresponds to boundary 6.

In one embodiment, first and second consecutive boundary axes are determined by computing an angle r(i) formed by each boundary axis defined by the viewing position coordinates (x,z) and each boundary point $p_i=(u_i,v_i)$ in the primary coordinate plane using the following equation:

$$r(i) = \tan^{-1}\left(\frac{x - u_i}{z - v_i}\right) \qquad \text{Eq. 1}$$

Once angles are determined, they are mapped such the $\rho(i)=r(i)-r(0)$. In this way, $\rho(0)=0$ and $\rho(N)=2\pi$, where N is the number of boundaries. Also, the user's viewing orientation vector angle given by t is redefined to lie between 0 and $2\pi$ as follows: $\theta=t-r(0)$. Next, mapped angles are compared to determine the first boundary axis $\rho(i)$ and second boundary axis $\rho(i+1)$ that conforms to the following criterion:

$$\rho(i) \leq \theta < \rho(i+1) \qquad \text{Eq. 2}$$

The boundary points (e.g., $p_6$ and $p_7$, FIG. 3) associated with the first and second boundary axes define the selected boundary (e.g., boundary 6).

Figure 4:
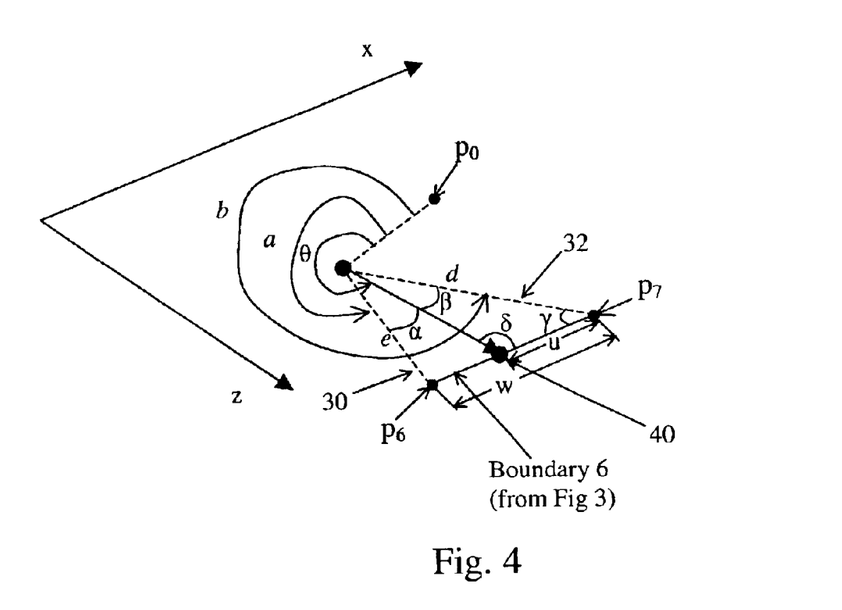
FIG. 4 illustrates using angles to determine an offset for locating a first intermediate point in a primary coordinate plane in the three-dimensional area shown in FIG. 1.

Once the selected boundary is identified, the coordinate of a selected point on the selected boundary is determined dependent on angles formed by the selected boundary, the first and second boundary axes and the viewing orientation vector (22, FIG. 2). FIG. 4 shows boundary 6 defined by boundary points $p_6$ and $p_7$. FIG. 4 shows angle a (or $\rho(i)$) formed by the first boundary axis, angle b (or $\rho(i+1)$) formed by the second boundary axis, and angle $\theta$ corresponding to the viewing orientation vector. The angle $\alpha$ is the difference between the angle associated with the first boundary axis and the viewing orientation vector or:

$$\alpha = \theta - a. \qquad \text{Eq. 3}$$

The angle β is the difference between the angle associated with the second boundary axis and the viewing orientation vector or:

$$\beta = b - \theta \qquad \text{Eq. 4}$$

By the law of cosines:

$$\gamma = \cos^{-1}\left(\frac{(w^2 + d^2 - e^2)}{2dw}\right) \qquad \text{Eq. 5}$$

Furthermore, given that the sum of all interior angles of a triangle equals π, then:

$$\delta = \pi - \beta - \gamma \qquad \text{Eq. 6}$$

Using the law of sines, an offset u from boundary point $p_7$ is determined by the following:

$$u = d\left(\frac{\sin(\beta)}{\sin(\delta)}\right) \qquad \text{Eq. 7}$$

The offset is then used to determine the coordinate of the selected point defined with respect to the primary coordinate plane based on the offset and the boundary point $p_7$ with respect to boundary 6 in FIG. 4.

The selected point coordinate is matched with the coordinate of one of a plurality of image object coordinates to identify the selected image object (23, FIG. 2). In one embodiment, image objects are stored with associated image object coordinates wherein the storage area can be searched to identify the image object having a coordinate range that the selected point coordinate falls within.

Figure 5:
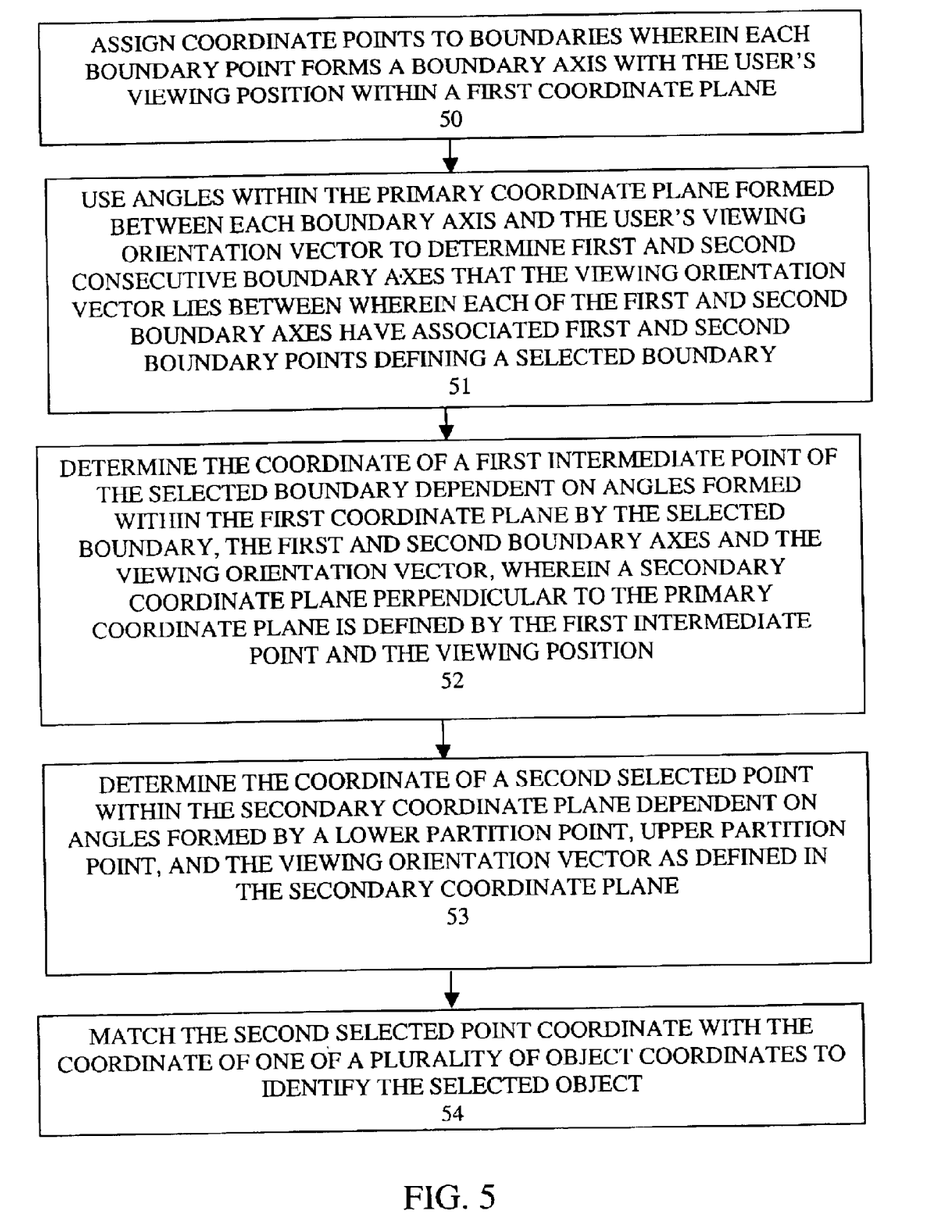
FIG. 5 illustrates a second embodiment of a method of identifying a selected image object in a three-dimensional graphical environment in accordance with the present invention.
Figure 6:
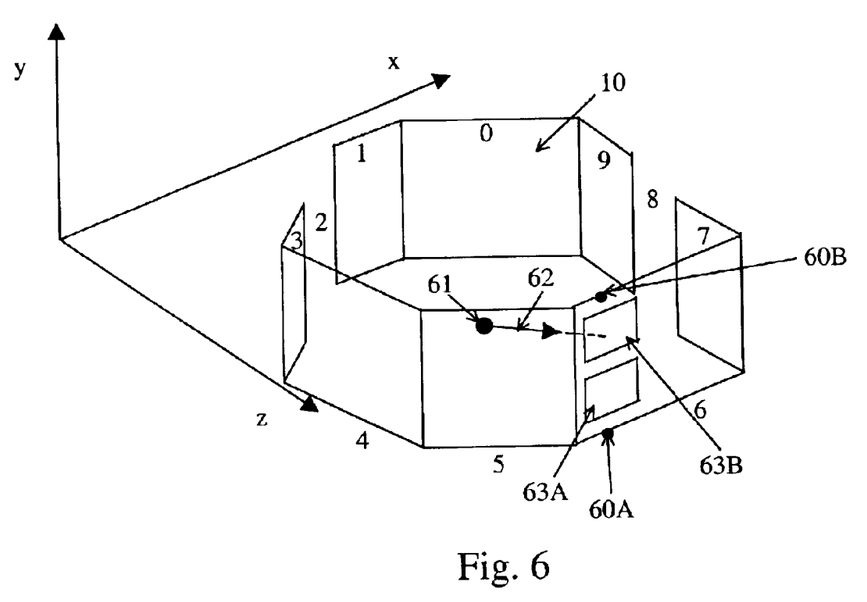
FIG. 6 illustrates a bounded three-dimensional graphical area having rows of image objects and a corresponding viewing perspective.

FIG. 5 shows a second embodiment of the method of identifying an image object within a three-dimensional graphical environment. According to this method, it is assumed that a plurality of rows of image objects can be displayed along the partitions. As shown in FIG. 6, two image objects 63A and 63B forming two rows are displayed on partition 6. In addition, according to this method the viewing perspective of a user interface device is defined by a viewing position 61 (or coordinate) and a viewing orientation vector 62 within the three-dimensional graphical environment. The viewing orientation vector 62 is defined by a pan angle and a tilt angle within the environment. In the example environment shown in FIG. 6, the viewing position and viewing orientation are both defined within each of the x-z plane and the x-y plane.

Figure 7:
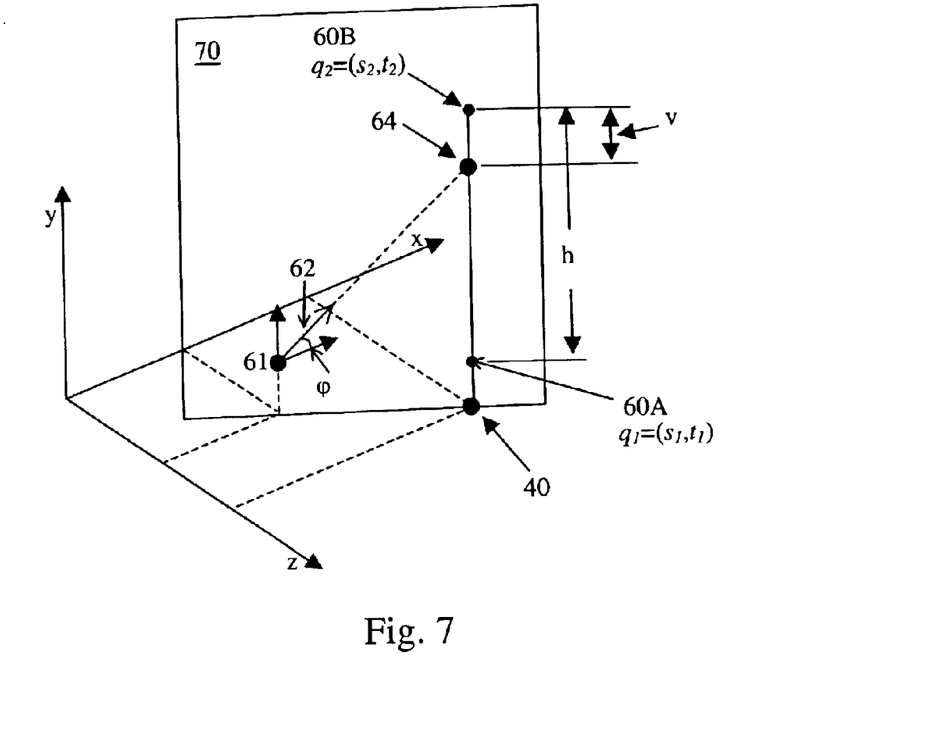
FIG. 7 illustrates first and second selected points and a viewing orientation as defined in the primary and secondary coordinate planes.

According to the method shown in FIG. 5, a first intermediate point within a primary coordinate plane is determined in the same manner as shown in FIG. 2 to determine a first selected point 40. Specifically, according to the method shown in FIG. 5, coordinate points are assigned to boundaries within the primary coordinate plane (50), the angles formed between each boundary axis and the viewing orientation vector within the first coordinate plane are used to determine first and second consecutive boundary axes within the first coordinate plane that the viewing orientation vector lies between (51) (where each of the first boundary axis and the second boundary axis has associated first and second boundary points defining a selected boundary), and once the selected boundary is identified within the primary coordinate plane, the coordinate of a first intermediate point 40 on the selected boundary is determined dependent on angles formed within the first coordinate plane by the selected boundary, the first and second boundary axes and the viewing orientation vector (52). The first intermediate point 40 is used to define a secondary coordinate plane such that the secondary coordinate plane 70 is defined by the viewing position 61 and the first intermediate point 40 (FIG. 7).

Once the first intermediate point 40 (FIG. 7) is determined, the coordinate of a second selected point within the secondary coordinate plane is determined dependent on angles formed by a lower partition point 60A, an upper partition point 60B, and the viewing orientation vector as defined in the secondary coordinate plane 70 (53, FIG. 5). The area between the lower and upper partition points corresponds to the area in which image objects are potentially displayed on the partitions within the bounded area. For instance, the lower partition point may correspond to point 60A in FIG. 6 and the upper partition point may correspond to point 60B. The lower partition point is defined as having coordinates $q_1 = (s_1, t_1)$ (as defined with respect to the secondary coordinate plane). The upper partition point is defined by $q_2 = (s_2, t_2)$ such that the partition display area height is h. It should be noted that the lower boundary point (60A) may or may not be the same as the first intermediate point (40) and hence may or may not reside within the primary coordinate plane.

In one embodiment, the coordinate of the second selected point within the secondary coordinate system is determined by redefining the angles a and b (FIG. 8) with respect to the secondary coordinate plane (e.g., transformed x-y coordinate plane) as defined by the y-axis and φ as follows:

$$a = \tan^{-1}\left(\frac{s_1 - x}{t_1 - y}\right) \qquad \text{Eq. 8}$$

$$b = \tan^{-1}\left(\frac{s_2 - x}{t_2 - y}\right) \qquad \text{Eq. 9}$$

The angle α is the difference between the angle associated with the segment formed by the viewing position 61 and the lower partition point 60A or:

$$\alpha = a - \phi. \qquad \text{Eq. 10}$$

The angle β is the difference between the viewing orientation vector in the secondary coordinate plane and the segment formed by the viewing position 61 and the upper partition point 60B or:

$$\beta = \phi - b \qquad \text{Eq. 11}$$

By the law of cosines:

$$\gamma = \cos^{-1}\left(\frac{(h^2 + d^2 - e^2)}{2dh}\right) \qquad \text{Eq. 12}$$

Furthermore, given that the sum of all interior angles of a triangle equals π, then:

$$\delta = \pi - \beta - \gamma \qquad \text{Eq. 13}$$

Using the law of sines, an offset v from point 60B is determined by the following:

$$v = d\left(\frac{\sin(\beta)}{\sin(\delta)}\right) \qquad \text{Eq. 14}$$

Figure 8:
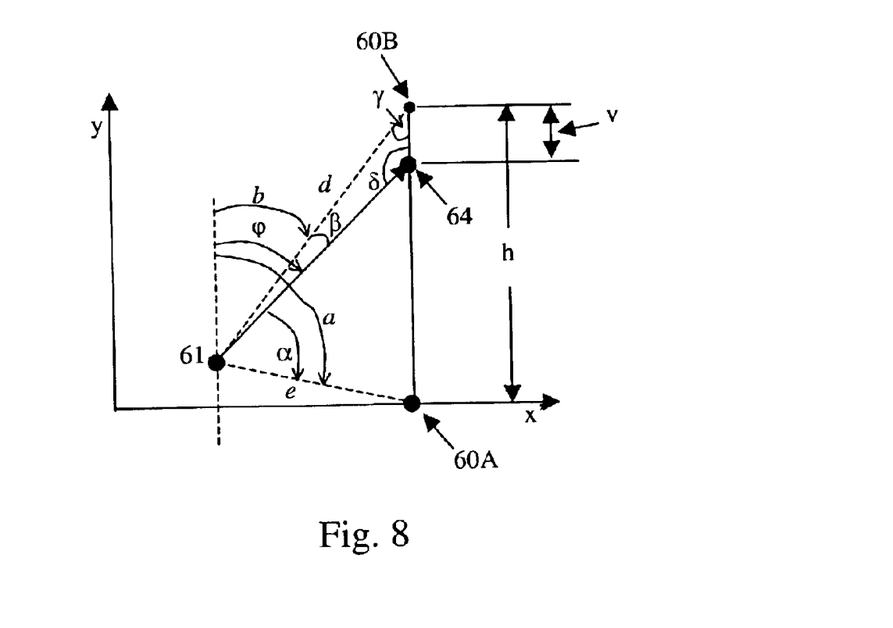
FIG. 8 illustrates using angles to determine an offset in the secondary coordinate plane for locating the second selected point in the three-dimensional area shown in FIG. 6.

The offset is then used to determine the coordinate of the second selected point based on the offset v and the known point 60B shown in FIG. 8.

As with the embodiment shown in FIG. 2, the second selected point coordinate is matched with the coordinate of one of a plurality of image object coordinates to identify the selected image object (54, FIG. 5). In one embodiment, image objects are stored with associated image object coordinates wherein the storage area can be searched to identify the image object having a coordinate range that the selected point coordinate falls within.

Figure 9:
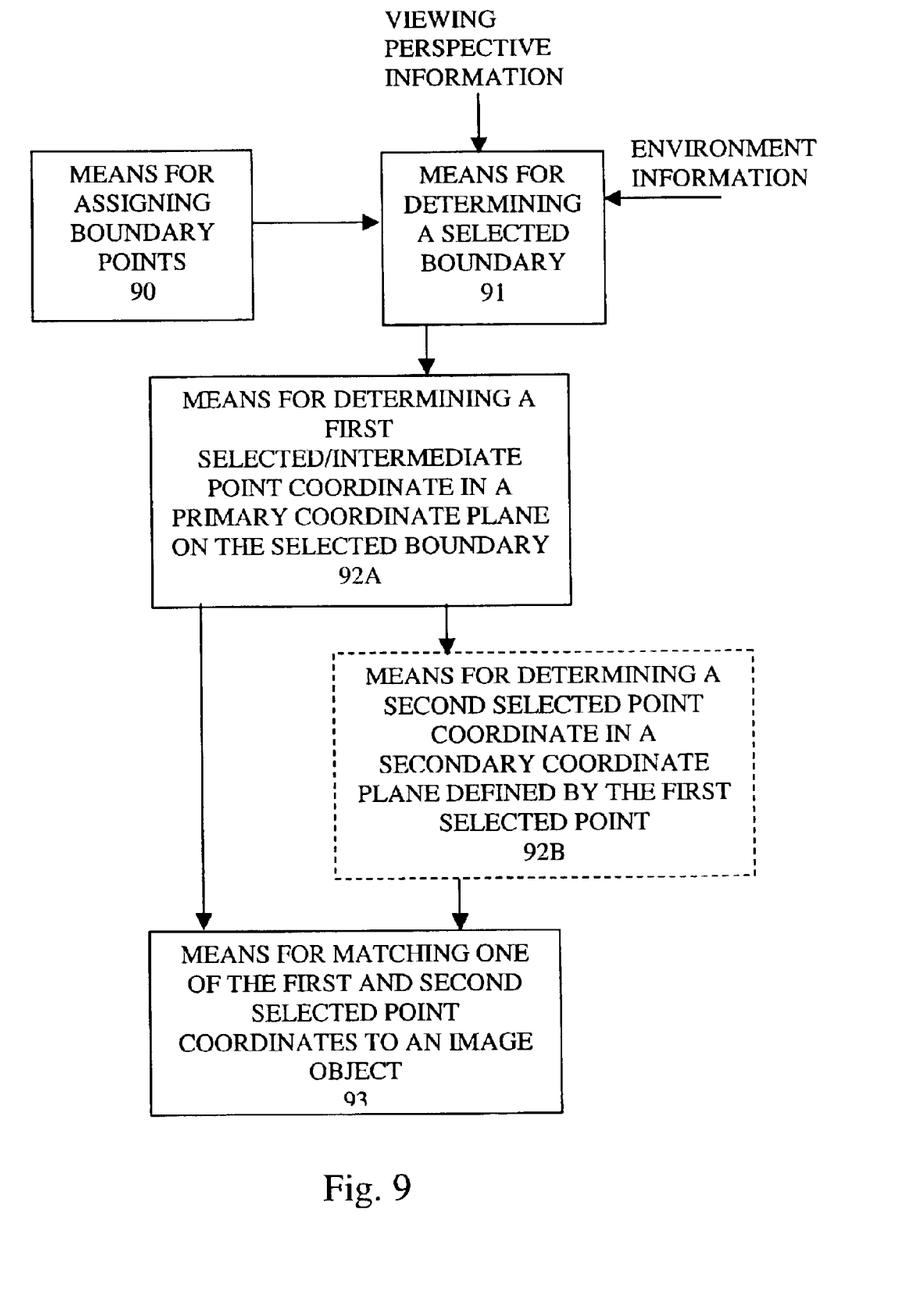
FIG. 9 illustrates one embodiment of a system of identifying a selected image object in a three-dimensional graphical environment in accordance with the present invention.

FIG. 9 shows one embodiment of a system of identifying a selected image object displayed within a three-dimensional graphical area including a means for assigning boundary points 90, a means for determining a selected boundary 91, a means for determining a first selected/intermediate point coordinate on the selected boundary 92A, a means for determining a second selected point coordinate within a secondary coordinate plane defined by the first selected/intermediate point and the viewing position 92B, and a means for matching a selected point coordinate to an image object 93. The dashed representation of the second selected point determination means 92B indicates that one embodiment of the system in which image objects are displayed in rows includes means 92B and another embodiment of the system in which image objects are displayed in a single row does not include means 92B. It should be noted that elements 90–93 can be implemented by a system including a processor or processing device. Moreover, elements 90–93 can be implemented by any combination of software, hardware, or firmware.

In one embodiment the means for determining a selected boundary 91 includes a means determining an angle ($\rho(0)$ to $\rho(N)$) formed by each of N boundary axes and the viewing position, a means for mapping the determined angles to a range of $[0,2\pi]$, and a means for finding first and second consecutive boundary axis angles ($\rho(i)$, $\rho(i+1)$) that the viewing orientation vector ($\theta$) lies between dependent on the criterion: $\rho(i) \leq \theta < \rho(i+1)$. The means for determining a selected point coordinate on the selected boundary 92A includes a means for determining an offset distance from one of the first and second boundary points corresponding to the first and second boundary axes using the angles formed by the selected boundary, the first and second boundary axes and the viewing orientation vector.

In another embodiment of the system shown in FIG. 9, the system further includes a means for determining a secondary coordinate plane and a second selected point coordinate within this secondary coordinate plane as defined by the viewing position and viewing orientation vector. According to this embodiment and the method as shown in FIG. 5, the means for determining the second selected point determines the second point by determining an offset distance from an upper partition point.

Hence, a system and method of identifying a selected image object in a three-dimensional graphical environment that requires minimal computational steps and minimal memory storage is described.

In the preceding description, numerous specific details are set forth in order to provide a thorough understanding of the present invention. It will be apparent, however, to one skilled in the art that these specific details need not be employed to practice the present invention. In addition, it is to be understood that the particular embodiments shown and described by way of illustration is in no way intended to be considered limiting. Reference to the details of these embodiments is not intended to limit the scope of the claims.

I claim:

1. A method of identifying a selected image object displayed within a three-dimensional graphical area bounded by partitioning boundaries, the image object being selected with an input device having an associated viewing perspective defined by a viewing position and a viewing orientation vector pointing from the viewing position, said method comprising:

assigning coordinate points to boundaries wherein each boundary point forms a boundary axis with the viewing position and the viewing orientation vector forms an angle with each boundary axis (20);

using angles formed between each boundary axis and the viewing orientation vector to determine first and second consecutive boundary axes that the viewing orientation vector lies between wherein each of the first and second boundary axes have associated first and second boundary points defining a selected boundary where a selected image object is located (21);

determining the coordinate of a selected point on the selected boundary dependent on angles formed by the selected boundary, the first and second boundary axes, and the viewing orientation vector (22);

matching the selected point coordinate with the coordinate of one of a plurality of image object coordinates to identify the selected image object (23).

2. The method as described in claim 1 wherein using angles to determine first and second consecutive boundary axes that the viewing orientation vector lies between comprises determining an angle formed by each boundary axis and the viewing orientation vector.

3. The method as described in claim 2 farther comprising mapping all determined angles within the range of $[0,2\pi]$.

4. The method as described in claim 2 comprising comparing angles to a given criterion.

5. The method as described in claim 1 wherein determining the coordinate of a selected point further comprises determining an offset distance from one of the first and second boundary points.

6. A system identifying a selected image object displayed within a three-dimensional graphical area bounded by partitioning boundaries, the image object being selected with an input device having an associated viewing perspective defined by a viewing position and a viewing orientation vector pointing from the viewing position, said system comprising:

means for assigning coordinate points to boundaries wherein each boundary point forms a boundary axis with the viewing position and the viewing orientation vector forms an angle with each boundary axis (50);

means for determining a selected boundary where a selected image object is located using angles formed between each boundary axis and the viewing orientation vector (51);

means for determining the coordinate of a first point of the selected boundary dependent on first angles formed by the selected boundary, the first and second boundary axes, and the viewing orientation vector (52);

means for matching one of first and second point coordinates with the coordinate of one of a plurality of image object coordinates to identify the selected image object (53).

7. The system as described in claim 6 wherein the first point defines a secondary coordinate plane, the system further comprising a means for determining the coordinate of a second point within the secondary coordinate plane dependent on second angles formed by a lower partition point, upper partition point, and the viewing orientation vector as defined in the secondary coordinate plane.

8. The system of identifying a selected image object displayed within a three-dimensional graphical area bounded by partitioning boundaries, the image object being selected with an input device having an associated viewing perspective defined by a viewing position and a viewing orientation vector pointing from the viewing position, said system comprising:

at least one processor:

for assigning coordinate points to boundaries wherein each boundary point forms a boundary axis with the viewing position and the viewing orientation vector forms an angle with each boundary axis;

for using angles formed between each boundary axis and the viewing orientation vector to determine a selected boundary where a selected image object is located;

for determining the coordinate of a first point of the selected boundary dependent on angles formed by the selected boundary, the first and second boundary axes, and the viewing orientation vector;

for matching the one of the first and second point coordinates with the coordinate of one of a plurality of image object coordinates to identify the selected image object.

9. The system as described in claim 8 wherein the first point defines a secondary coordinate plane, the processor further determining the coordinate of a second point within the secondary coordinate plane dependent on second angles formed by a lower partition point, upper partition point, and the viewing orientation vector as defined in the secondary coordinate plane.

10. A method of identifying a selected image object displayed within a three-dimensional graphical area bounded by partitioning boundaries, the image object being selected with an input device having an associated viewing perspective defined by a viewing position and a viewing orientation vector pointing from the viewing position, said method comprising:

assigning coordinate points to boundaries wherein each boundary point forms a boundary axis and the viewing position within a primary coordinate plane and the viewing orientating vector forms an angle with each boundary axis (50);

using first angles within the primary coordinate plane formed between each boundary axis and the viewing orientation vector to determine first and second consecutive boundary axes that the viewing orientation vector lies between wherein each of the first and second boundary axes have associated first and second boundary points defining a selected boundary where a selected image object is located (51);

determining the coordinate of a first point of the selected boundary dependent on angles formed by the selected boundary within the first coordinate plane, the first and second boundary axes, and the viewing orientation vector (52), wherein a secondary coordinate plane perpendicular to the first coordinate plane is defined by the first point and the viewing position;

determining the coordinate of a second point within the secondary coordinate plane dependent on second angles formed by a lower partition point, upper partition point, and the viewing orientation vector as defined in the secondary coordinate plane (53);

matching the second point coordinate with the coordinate of one of a plurality of image object coordinates to identify the selected image object (54).

11. The method as described in claim 10 wherein using first angles to determine first and second consecutive boundary axes that the viewing orientation vector lies between comprises determining an angle formed by each boundary axis and the viewing orientation vector.

12. The method as described in claim 11 further comprising mapping all determined angles within the range of $[0, 2\pi]$.

13. The method as described in claim 11 comprising comparing first angles to a given criterion.

14. The method as described in claim 10 wherein determining the coordinate of the first point further comprises determining an offset distance.

15. The method as described in claim 10 comprising determining a first angle formed by the viewing orientation vector in the secondary coordinate plane and a first segment formed by the viewing position and a lower partition point and a second angle formed by the viewing orientation vector in the secondary coordinate plane and a second segment formed by the viewing position and an upper partition point.

16. The method as described in claim 15 further comprising determining an offset from one of the lower and upper partition points using the first and second angles and the viewing position.

\* \* \* \* \*